July 6, 1965   G. R. S. CHARLES ETAL   3,192,738
ORNAMENTAL BEADS AND LIKE BODIES
Original Filed Sept. 22, 1959   2 Sheets-Sheet 1
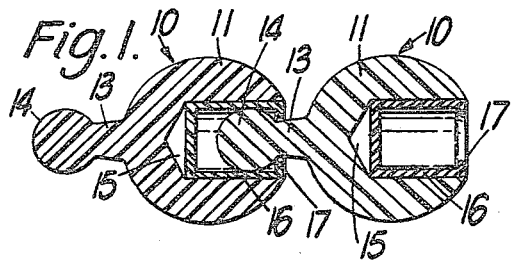
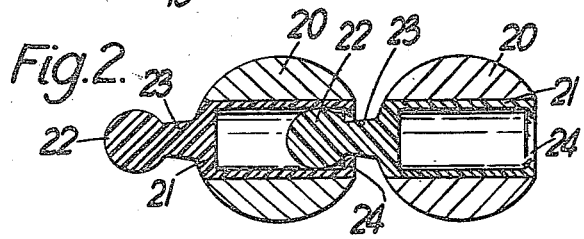
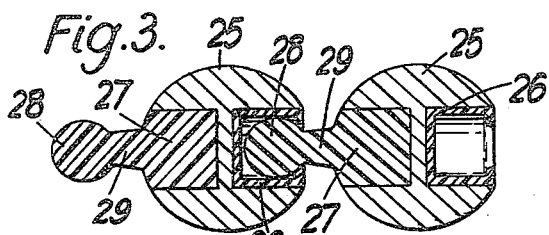
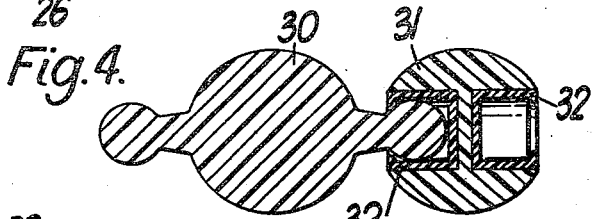
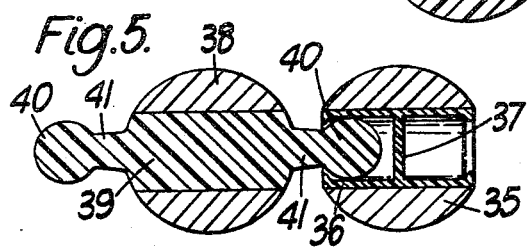
Inventors
G. R. S. Charles
W. T. Sanderson
By
Watson, Cole, Grindle + Watson
Attys.

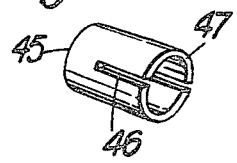
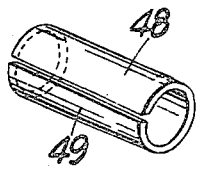
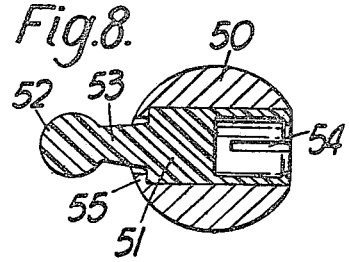

United States Patent Office 3,192,738
Patented July 6, 1965

3,192,738
ORNAMENTAL BEADS AND LIKE BODIES
Geoffrey Russell Stafford Charles and William Troutbeck Sanderson, Marlow, England, assignors to Chelton (Hong Kong) Limited, Hong Kong, a corporation of Hong Kong
Original application Sept. 22, 1959, Ser. No. 841,536, now Patent No. 3,066,501, dated Dec. 4, 1962. Divided and this application Nov. 29, 1962, Ser. No. 241,003
Claims priority, application Great Britain, Dec. 4, 1958, 39,189/58
3 Claims. (Cl. 63—2)

This application is a division of application Serial No. 841,536, filed September 22, 1959, now Patent No. 3,066,501, issued December 4, 1962.

This invention relates to ornamental beads and like bodies which are suitable for forming necklaces, bracelets and like articles consisting of a number of bodies which have to be joined together. Such bodies will hereinafter be referred to as beads but it will be understood that this term is intended to include all ornamental bodies adapted to be joined together to form, for example, a necklace or a bracelet or a pendant ornament.

In the specification of U.S. Patent No. 2,714,269 there are described beads made of resilient plastic material of which one of a pair of beads to be joined is formed with a neck carrying a head and the other is formed with a socket which is entered through a mouth of smaller cross-section than the socket interior, the head of one bead and the mouth on the other being so shaped and dimensioned in relation to one another that the head will not ordinarily pass through the mouth but, due to the resilience of the resilient plastic material, can be forced through with a snap action when it is required to join the two beads together. The beads specifically described in the above-mentioned specification have a socket with a circular mouth which has an inwardly directed lip extending around the whole periphery; to produce such a lip in a single moulding operation using a simple withdrawable core for forming the socket with the lip, it is necessary to make the bead of a relatively resilient material so as to permit of withdrawal of the core after the bead has been formed. Because of this, polythene has almost universally been employed for such beads. For many reasons, however, notably for surface coating or to improve the outward appearance and general attractiveness, materials harder, i.e., less resilient than polythene are often desirable for beads and the like and it is one of the objects of the present invention to provide a novel form of bead permitting, if desired, the use of much harder materials than polythene.

According to this invention, a pair of beads are formed of relatively rigid material with at least one of the beads having a resilient insert, which insert either has a protruding head on the end of a neck to engage in a socket in the other bead or is shaped to constitute at least a resilient mouth portion of a socket adapted to receive a head on the end of a neck on the other bead, the socket having a mouth with a lip or lips and being so shaped and dimensioned that the head of one bead can be retained in the socket of another bead by the lip or lips to join the beads together whilst permitting relative angular movement of the two beads. Relative angular movement of the two beads is possible provided the socket is sufficiently large to permit free play of the head in the socket or provided the neck carrying the head is flexible. It will be particularly noted that this construction permits of considerable flexibility in the junction between the beads, unlike a simple ball and socket joint. The above described construction permits of beads being formed in relatively hard materials such as metals, glass or wood or hard plastic material, e.g., polystyrene. The joining together of the beads is not dependent on the resilience of the material forming the main body of the bead. Preferably the head, neck and socket are proportioned to allow relative movement between the two beads such that the axes of the neck and socket may be moved up to 30° out of alignment without restraint.

According to another aspect of the invention a pair of beads having a protruding head on the end of a neck on one bead co-operating with a socket on the other bead, the socket having a mouth with a lip or lips and being so shaped and dimensioned that the head on said one bead can be retained by the socket of the other bead by the lip or lips to join the beads together whilst permitting angular movement of the two beads is characterized in that at least one of the beads is formed of relatively rigid material with a resilient insert, the insert constituting either the head on the end of the neck of said one bead or at least the mouth portion of the socket in said other bead.

With many hard materials it is possible to form a head on the end of a neck integral with the main body of the bead and this may readily be done, for example, with metal or hard plastic, e.g., polystyrene, beads. If such a head on the end of a neck can be formed integrally on a bead, the adjacent bead to be joined thereto may be formed with a socket of which at least the mouth is constituted by a resilient insert. To form a long chain of beads such as is required for necklaces, if the beads can be formed with a head and neck integral with the main body of hard material, it is possible either to have alternate beads in a chain formed with two such heads on necks at diametrically opposite points and the intermediate beads provided with two inserts giving sockets with resilient mouths at diametrically opposite points or each bead may be formed with one head on the end of a neck and provided with a resilient insert constituting at least the mouth of a socket diametrically opposite the head. If the head and neck cannot be formed integrally with the main body of the bead, it may be constituted by an insert which may be of hard material or which may be of resilient material; in such an arrangement, if beads are to be formed in a long chain, each bead may have either two inserts at diametrically opposite points or one insert extending through a diametral bore. The insert or inserts may be arranged so that either each bead has one head and one socket or some beads have two heads for use with beads having two sockets.

Considered more generally, one bead may have a pair of heads with ends of necks arranged diametrically opposite one another and the other bead of a pair may have a pair of sockets arranged diametrically opposite one another or alternatively each bead may have a head on the end of a neck and have a socket disposed on the bead diametrically opposite to the head. In the former case, the two heads on the ends of the necks of one bead may be formed as a single resilient insert in the bead or as separate resilient inserts in the bead. Likewise two sockets in a single bead may be formed as a single resilient insert or as separate inserts. If the bead has a head on the end of a neck and has a socket, the head and neck and the socket in each bead may be formed as a single resilient insert or as separate resilient inserts. A single insert forming two sockets may comprise a cylindrical member of resilient material with inwardly directed lips at each end, this member extending through a bore in the bead body. The insert or each insert forming a single socket may comprise a resilient cylindrical member closed or partially closed at one end having an inwardly directed lip or lips at the other end. The closing or partial closing of the inner end of the cylinder facilitates the putting of the insert in a cavity in the bead body, particularly if the insert is made a tight fit in the cavity so as to grip, by its resilience, the cavity wall. In many cases, however, it may only be required to form the mouth of the socket of resilient material and in that case the insert may comprise conveniently an annular member of resilient material within a bore through the bead adjacent one end thereof bearing against a shoulder formed by a narrowed mouth of the bore and being retained therein by a cylindrical member within the bore. In the case of a bead having a socket and a head and neck, this cylindrical member may be constituted by the inner end of an insert carrying said head and neck.

A resilient insert may be formed of a material having greater resilience than the body of the bead, for example a polystyrene bead might have an insert made of polythene or nylon or methyl-methylacrylate. Material having a low coefficient of friction with respect to the head is preferable for a necklace as this assists in letting the beads hang freely and pleasingly. The insert however need not necessarily be formed of very resilient material; it may be formed of relatively hard material e.g. metal or a hard plastic, and constructed so as to permit of the mouth expanding to permit entry of a head on another bead. Such an insert may be formed for example as a cylinder having a lip or lips at one end and having one or more slots extending axially part of the way along the length of the cylinder from the lipped end. Conveniently two diametrically opposite slots are provided. The cylinder at the other end may be open or closed; if it is open the resilience of the insert may be increased by having slots extending axially for part of the length of the cylinder from this other end.

Conveniently a single lip extends around the whole periphery of the mouth but alternatively a number of separate segmental lips may be arranged around the periphery.

The insert may be secured in position by any convenient means; in some cases the resilience of the material will give sufficient grip in the cavity in the bead but an adhesive may be employed. In the former case, the lip may be so proportioned that when two assembled beads are pulled apart, the head of one bead pulls out of the socket, which socket itself remains in the second bead. Alternatively however, the socket formed by the insert may be arranged to pull out with the head and be retained on the head; the beads are thus joined together by inserting the socket insert (already on a head of one bead) in the cavity in another bead. The head and socket however, still provide the necessary free play to permit of relative angular movement of the beads when assembled. Where adhesive is used to secure the insert in position, the head and lip or lips may be so proportioned either to permit the two beads, once assembled, to be separated or not.

If a slotted insert is used and the insert is made of hard material, the insert can be made so that the head of another bead can be forced through the lip or lips of the insert only when the whole insert is free to expand because of the slots; thus the beads are assembled together by putting an insert on a head and then putting the insert in a cavity in another bead and, if the insert is secured in this cavity, for example by an adhesive, the beads cannot be pulled apart without destruction. This type of construction can be used with advantage with tough materials and allows a very small neck to be used, which may be desirable to give a more attractive appearance to certain beads.

In any of the above described arrangements in which, after assembly, the beads cannot be separated, a necklace may be provided with a clasp of the normal kind such as may be used for beads strung together or, alternatively, one or more of the beads in the necklace may be constructed so that adjacent beads can be separated, for example, by making the bead of a suitable resilient material or forming an insert so that either the insert may be separated from the body of the bead or the head of an adjacent bead may be pulled out of the insert.

The invention also includes within its scope a bead formed of relatively rigid material having an insert of relatively resilient material forming at least the mouth of a lipped socket or forming a protruding head on the end of a neck.

The following is a description of a number of embodiments of the invention, reference being made to the accompanying drawings in which:

FIGURES 1 to 5 are each sectional views of a pair of beads illustrating different constructions of beads;

FIGURES 6 and 7 are perspective views of inserts to be inserted into the beads; and FIGURE 8 is a longitudinal sectional view of a modified bead.

FIGURE 1 illustrates a pair of similar beads 10 in which the main body 11 of the bead is formed of metal, glass or wood or a relatively hard plastic material such as polystyrene. Formed integrally with the main body is a neck 13 protruding outwardly from the body and carrying an enlarged head portion 14. The body has a cavity 15 in which is placed an insert 16 formed of a relatively resilient material such as polythene or nylon or methyl methylcrylate. This insert is in the form of a short cylinder which is preferably closed at the inner end and which has a lip 17 around the mouth, which mouth is formed flush with the surface of the main body of the bead. The mouth and cavity of the insert 16 are so shaped and dimensioned with respect to the head 14 and neck 13 of another bead that the head 14 can be inserted through the mouth with a snap action and is retained therein by the lip 17 but the two beads have freedom for relative angular movement so that they can be moved up to about 30° out of alignment without restraint. The inner end of the insert is preferably closed to facilitate pushing the insert 16 into the cavity 15 in the body 11 of the bead. The insert 16 may be retained in position merely by its resilience, the insert bearing against the surrounding cylindrical wall of the cavity 15 and being retained therein by friction. If desired, however, the insert can be secured by an adhesive. The construction of FIGURE 1 enables a number of similar beads to be formed with all of the beads made of a relatively hard material, yet the beads can be joined and separated so as to make a chain of any desired length in a manner similar to that employed with the resilient plastic beads of the aforementioned U.S. Patent No. 2,714,269. In particular the use of a resilient insert, as in this arrangement, permits of the use of polystyrene for moulding the main bodies of the beads and thus the beads can be made transparent. Attractive color effects in this arrangement and in constructions to be described later may be obtained by tinting the polystyrene material and/or by coloring the wall of the cavity 15 in which the insert 16 is placed or by the use of a colored insert. Other attractive effects may be obtained by silvering the cavity wall or the outer surface of the insert.

In an alternative construction shown in FIGURE 2, the beads are formed with bodies 20 moulded of relatively hard material, each bead having a bore extending through it and in this cavity there is placed an insert 21 formed of resilient plastic material such as polythene, the insert having a head 22 on the end of a neck 23 protruding from the body of the bead and having lips 24 forming the mouth of a socket at the opposite end of the bore. It will be seen that the beads of FIGURE 2 may be joined together in a chain exactly as the beads of FIGURE 1, but have the further advantage that the head and neck are resilient so facilitating the insertion of the head into a socket. The insert 21 may be retained in the body 20 by the resilience of the insert giving a frictional grip or by the use of an adhesive.

FIGURE 3 illustrates a modification of FIGURE 2 in which there are two separate inserts. Each bead has a body 25 formed, as before, of a relatively hard material and has a cavity containing an insert 26 forming a socket. The insert is made of resilient plastic material and may be similar to the insert forming the socket of FIGURE 1. Diametrically opposite to the socket is a hole containing a second insert 27 having a head 28 on the end of a neck 29 protruding outwardly from the bead. The insert 27 may be made of relatively resilient plastic material or, if desired, may be made of metal or other hard material.

In the arrangement illustrated in FIGURE 4, alternate beads 30 in a chain may be formed with two heads, these beads being joined together by beads 31 having two sockets. The beads 30 may be formed of relatively hard material such as metal, glass or wood or a moulded plastic such as polystyrene. Similar hard material may also be used for the bodies of the beads 31. The bead 30 is illustrated in FIGURE 4 as being formed in one piece, for example by moulding of plastic material, the heads and necks being integral with the body of the bead. The bead 31 may have two separate relatively resilient sockets formed by inserts 32 similar to the inserts 16 of FIGURE 1.

As illustrated in FIGURE 5 a bead 35 with two sockets may be formed with a bore extending through it and a single insert 36 forming the two sockets. Such an insert preferably has a web 37 extending across the cylindrical aperture of the insert to facilitate fixing of the insert in position. FIGURE 5 also illustrates a bead 38 formed of relatively hard material with a resilient insert 39 extending through a bore in the bead and having two heads 40 on the necks 41 for joining to a bead with two sockets.

The inserts described above forming sockets are all closed at one end or have a transverse wall. This is to facilitate the putting of the insert into a cavity in a bead body as the insert can be forced into the cavity on the end of a plunger. It will be appreciated that the insert need be only partially closed for this purpose if so desired.

In all the above described arrangements, the insert forming a socket may have a single lip extending around the whole periphery of the mouth but alternatively a number of separate segmental lips may be arranged around the periphery in the manner similar to that employed in the beads described in the specification of U.S. application No. 680,704, filed August 28, 1957, now Patent Number 2,947,053.

If the insert is retained in the cavity of the bead merely by the resilience of the material, the construction may be made so that when the assembled beads are pulled apart, instead of the head of one bead pulling out of the socket formed by the insert, the socket itself pulls out with the head and is retained on the head. The beads are thus joined together by inserting the socket insert (already on a head of one bead) in the cavity in another bead. The head and socket will provide the necessary free play to permit of relative angular movement of the beads when assembled. This arrangement is particularly advantageous if the insert forming the socket is formed in the manner shown in FIGURE 6 in which an insert 45 has a number of slits 46 extending part of the way along the length of the insert to impart the necessary resilience. Two such slits 46 diametrically opposite one another may be adequate in many cases. Such an insert may be made of material such that the head on the end of the neck of one bead cannot be pulled out of the insert when the insert is retained in the cavity of another bead. The insert 45 shown in FIGURE 6 is an insert to form a single socket with a lip 47 at one end and may be closed or partly closed at the inner end. It will readily be appreciated that an insert to form two sockets, analogous to the insert 32 of FIGURE 4 may readily be formed as a cylinder open and lipped at both ends, the slits extending part of the way along the length of the cylinder from each end.

FIGURE 7 illustrates another form of insert 48. In this construction there is a single slit 49 extending the whole length of the cylindrical insert to impart the necessary resilience to the structure. FIGURE 7 illustrates an insert forming two sockets; a similar construction may be employed for an insert forming a single socket.

If an insert having slits such as is illustrated in FIGURES 6 and 7 is used, and the insert is made of hard material, the insert can be made so that the head of another bead can be forced through the lip or lips of the insert only when the whole insert is free to expand because of the slots; thus, the beads are assembled together by putting an insert on a head and then putting the insert in a cavity in another bead and, if the insert is secured in this cavity, for example by an adhesive, the beads cannot be pulled apart without destruction. This type of construction can be used with advantage with tough materials and allows a very small neck to be used, which may be desirable to give a more attractive appearance to certain beads.

FIGURE 8 illustrates a bead having a relatively hard body portion 50 and an insert 51 carrying a head 52 on the end of a neck 53, the insert constituting also a socket portion. In this arrangement the insert has a slit 54 extending from the mouth of the socket portion inwardly to impart the necessary resilience. The insert is made slidable within the body of the bead 50 so that it can slide to the right as viewed in FIGURE 8, being prevented from further movement to the left by means of a step 55 moulded in the body portion. When it is required to join two beads together, the insert is slid to the right so that the lipped mouth of the socket portion can be opened slightly to allow of the head of the next bead being admitted into the socket portion. The body portion 50 is then slid back into position on the insert 51 to retain the head within the socket. The insert is made so that the head of an adjacent bead cannot be pulled out of the socket when the insert is embraced by the main body of the bead but can be when the insert has been partially slid out of the main body. This arrangement thus ensures that the beads are securely joined together and can only be unplugged by sliding the body portion along the insert away from he socket end thereof. The insert in FIG. 8 has axial slits and in this case may conveniently be made of metal or other hard material. Alternatively the insert may be made of a plastic material such as polythene or in this case a harder material such as nylon can be used if it is suitably dimensioned.

We claim:

1. In a necklace, a pair of beads formed of a rigid synthetic plastic material having the rigid properties of polystyrene with each of said beads having a body portion with a cavity extending entirely therethrough with opposite external openings in the body portion, and an insert of resilient synthetic plastic material having the flexible and resilient properties of polyethylene secured in the cavity of the body portion of each bead, said insert having an integral neck and head projecting from one of the openings in the body portion and a socket means with a mouth portion at the other opening adapted to receive the head on the end of the neck on the adjacent bead, said mouth having a lip means forming a restricted opening into said socket means and said restricted opening being normally of a size too small to admit said head of said adjacent bead, said lip means being deformable to admit said head whereby the head of one bead can be fitted into and retained in the socket means of the other bead with the one bead head portion extending into the other bead socket means and the other bead lip means adjacent the one bead neck to thereby join the beads together while permitting relative angular adjustment of the two beads by movement of the one bead head in the other bead socket means due to the loose fit of the one bead lip means around the other bead neck.

2. In a necklace according to claim 1, in which the insert has at least one slot in the socket means extending from the mouth portion a distance inwardly therefrom to impart added resilience to the mouth portion.

3. In a necklace according to claim 1, in which the insert has two oppoiste slots in the socket means extending from the mouth portion a distance inwardly therefrom to impart added resilience to the mouth portion.

References Cited by the Examiner
UNITED STATES PATENTS
3,066,501  12/62  Charles et al. _____ 63—2

RICHARD C. PINKHAM, *Primary Examiner.*